United States Patent [19]

Ohtomi

[11] Patent Number: 5,040,767
[45] Date of Patent: Aug. 20, 1991

[54] TRAVELING STAND FOR TRAVELING TYPE INDUSTRIAL ROBOT DEVICE

[75] Inventor: Sadayuki Ohtomi, Aichi, Japan

[73] Assignee: Mitsubishi Denki K.K., Tokyo, Japan

[21] Appl. No.: 358,762

[22] Filed: May 30, 1989

[30] Foreign Application Priority Data

May 30, 1988 [JP] Japan ................. 63-130265

[51] Int. Cl.[5] .......................... F16M 11/00
[52] U.S. Cl. .................... 248/679; 248/901; 248/500
[58] Field of Search .............. 248/676, 901, 678, 500, 248/679

[56] References Cited

U.S. PATENT DOCUMENTS

| 3,661,051 | 5/1972 | Dunne et al. | |
|---|---|---|---|
| 3,665,148 | 5/1972 | Yasenchak et al. | |
| 3,727,119 | 4/1973 | Stanley et al. | |
| 3,799,461 | 3/1974 | Skeen et al. | 248/678 X |
| 3,851,626 | 12/1974 | Boyd et al. | 248/678 X |
| 4,631,464 | 12/1986 | Kato. | |
| 4,636,699 | 1/1987 | Kato. | |

OTHER PUBLICATIONS

Robot No. 52, Japan Industrial Robot Association, Jun. 1986.
Robot No. 60, Japan Industrial Robot Association, Nov. 1987.

*Primary Examiner*—Alvin C. Chin-Shue
*Attorney, Agent, or Firm*—Sughrue, Mion, Zinn, Macpeak & Seas

[57] ABSTRACT

A traveling stand for a traveling type industrial robot device, along which the industrial robot device moves to carry out predetermined operations according to a predetermined operation order to a plurality of work stations arranged along the traveling stand. With a traveling stand, the positioning of the industrial robot can be accomplished accurately regardless of an occurrence of expansion or contraction of the stand due to change in an ambient temperature.

3 Claims, 3 Drawing Sheets

X-X

Y-Y

Z-Z

TRAVELING STAND FOR TRAVELING TYPE INDUSTRIAL ROBOT DEVICE

BACKGROUND OF THE INVENTION

This invention relates to an industrial robot device traveling on a traveling stand, and more particularly to a mounting structure of the traveling stand in which traveling original point can be set with accuracy.

FIG. 1 is a perspective view showing the entire arrangement of an ordinary traveling type industrial robot device. In FIG. 1, reference numeral 1 designates a traveling stand laid on a concrete floor; 2, a traveling type industrial robot device; 3, a traveling motor for driving, in response to an instruction from a control device (not shown), the robot 2 to a predetermined position on the traveling stand 1; 4, guide rails along which the robot device 2 moves linearly; 5, a rack engaged with a pinion (not shown) of the rotary shaft of the motor 3; 6, a pair of limit switches provided at both ends of the traveling stand 1, to prevent the over-running of the robot device 2; and 7, an original-point position detector arranged adjacent to one of the limit switches 6. When a dog 8 provided on the traveling robot device 2 approaches the detector 7, the latter 7 detects it and applies an original point position detection signal to the control device.

FIG. 2 is a plan view showing a plurality of work stations 9, (9a, 9b and 9c) which are arranged on the concrete floor along the traveling stand 1. At the work stations, a welding operation, assembling operation, etc. are carried out by the robot device 2. In FIG. 2, reference numeral 7 designates the aforementioned original point position detector.

With the traveling type robot device thus organized, teaching data on each of the reference positions of the work stations 9 which are determined from the number of revolutions of the pinion engaged with the rack 5 by referring to the position detected by the original point position detector 7 are stored in a memory in the control device (not shown). When robot work is started, the position of the robot device 2 is coincided with the plurality of work stations 9 in a predetermined order, with the original point position as a reference, according to the positions of the work stations stored in memory, so that a variety of robot work such as welding work, assembling work and the like are carried out at the work stations 9.

There occurs such a problem in the above-described conventional traveling type robot device that the expansion and contraction of the traveling stand 1 installed on the concrete floor may not be made constant depending on the degree of tightening of anchor bolts embedded in the floor. This will be described in more detail. The traveling stand 6 is fixed with anchor bolts 10 embedded in the floor at positions A, B and C and with nuts 11 as shown in FIGS. 3A and 3B. The traveling stand is provided with fixing parts, respectively, at the positions A, B and C (hereinafter referred to as "fixing parts A, B and C"). The fixing parts A, B and C have bolt holes 12, each of which has a clearance with the amount of expansion of the traveling stand 1 taken into account as shown in FIG. 3B. Therefore, for instance when the degree of tightening of the bolts at the fixing part A is larger than those at the fixing parts B and C, the positions of the bolt holes 12; that is, the positions of the fixing parts B and C of the traveling stand 1 are shifted against the force of tightening the anchor bolt 10 as much as the amounts of expansion $\Delta LB$ and $\Delta LC$ at the fixing parts B and C with the fixing part A as reference which amounts of expansion correspond to the linear expansion coefficient of the traveling stand 1.

However, the degree of tightening at the fixing part A is not always larger than those at the fixing parts B and C. If it is decreased because of external vibration or fat and oil stuck, then the fixing part A is shifted with respect to the fixing part B or C as a reference. As a result, the reference distances la, lb and lc of the work stations 9a, 9b and 9c from the original point position detector 7 as shown in FIG. 2 cannot be maintained constant.

In general, if, in a traveling type industrial robot device, its traveling distance is ranged 10 m, the amount of expansion or contraction of the traveling stand 1 is 3 mm or more with the change 30° in ambient temperature. Therefore, if the original point position detector 7 is provided at the end of the traveling stand, then an error 3 mm in maximum is produced between the reference position of the work station 9c farthest from the original point and the reference position of the robot device 2.

The error may be corrected as follows. Temperature correcting means is provided in the control device, and with respect to the traveling distance of the robot device 2 which has been stored at the time of teaching. The number of revolutions of the traveling motor 3 during robot work is corrected as much as the change in temperature which occurs after the teaching. However, when the fixing parts are changed in the degree of tightening as described above, then the distance between the original point and the work stations 9a, 9b and 9c are not constant, and therefore it is impossible to perform the temperature correction accurately.

SUMMARY OF THE INVENTION

An object of the invention is to eliminate the above-described difficulties accompanying a conventional traveling type robot device. More specifically, an object of the invention is to provide a traveling stand for a traveling type industrial robot device in which the original point thereof is not affected by the change in temperature, and even when there is a difference between the temperature provided when a traveling distance is taught to the robot device and the temperature provided when the robot is in operation, the traveling distance can be positively corrected with respect to the temperature difference.

According to the invention, the above and other objects of the present invention is met by the provision of a traveling stand which is provided a plurality of traveling stand fixing members arranged in the direction of travel of the robot device, and one of the fixing members, which is positioned at the middle of a range of travel of the robot device, is so designed that the position thereof is not affected by the expansion or contraction of the traveling stand which is caused by the change in ambient temperature, while the remaining fixing members are so designed that the positions thereof are affected by the change in ambient temperature and the robot traveling original point is set as the above-described. The traveling stand expands or contracts with the change in ambient temperature centering at the fixing member which is positioned at the middle of the range of travel of the robot. Therefore, with the original point set at the above-described middle, the distance of travel of the robot to the work station farthest from the original point is decreased. Furthermore, according to the invention, the position of the traveling stand fixing member whose position is not affected by the change in ambient temperature is suitably selected. Therefore, the temperature correcting means in the control device, based on the traveling stand fixing member's position thus selected, can positively correct the error in robot travel distance which is due to the difference between the temperature provided at the time of teaching the robot and that provided when the robot is in operation.

DESCRIPTION OF THE PREFERRED EMBODIMENT

Figure 1:
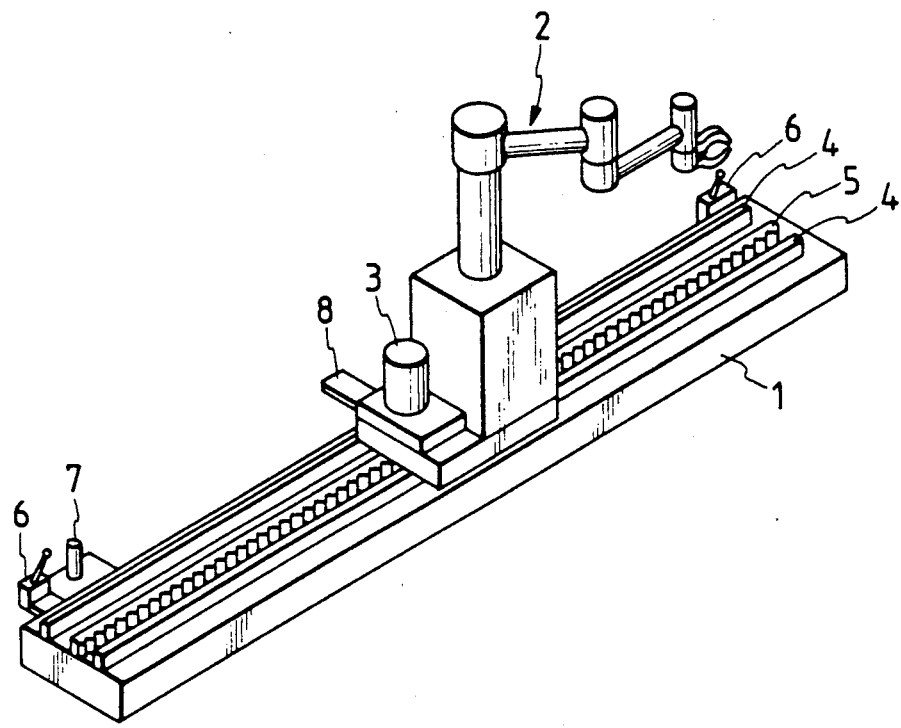
FIG. 1 is a perspective view showing the entire arrangement of an ordinary traveling type robot device.
Figure 2:
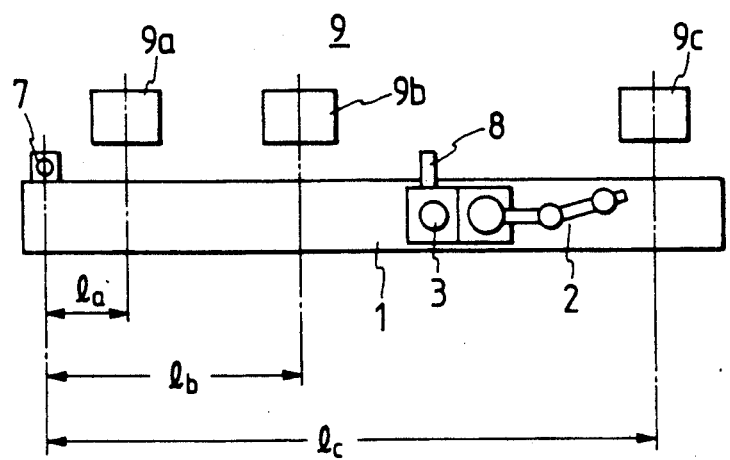
FIG. 2 is a plan view showing the traveling type robot device illustrated in FIG. 1 and work stations arranged along it.
Figure 3A:
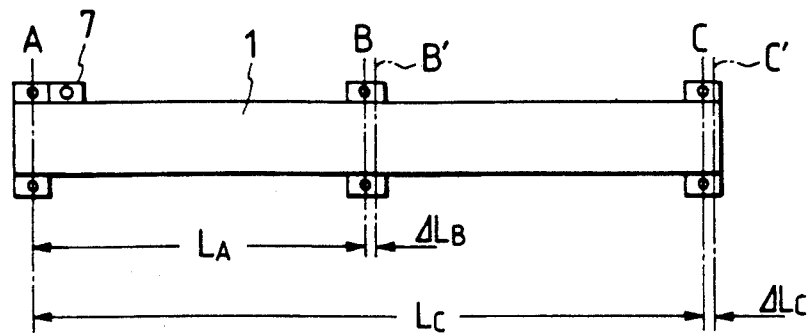
FIG. 3A is a plan view for a description of a problem to be solved by the invention.
Figure 3B:
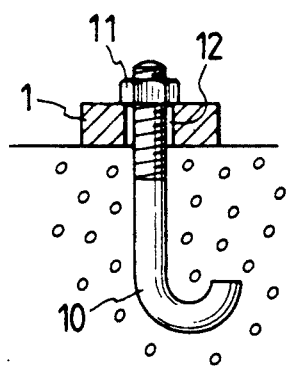
FIG. 3B is an enlarged sectional view showing components which are essential for the solution of the problem.
Figure 4:
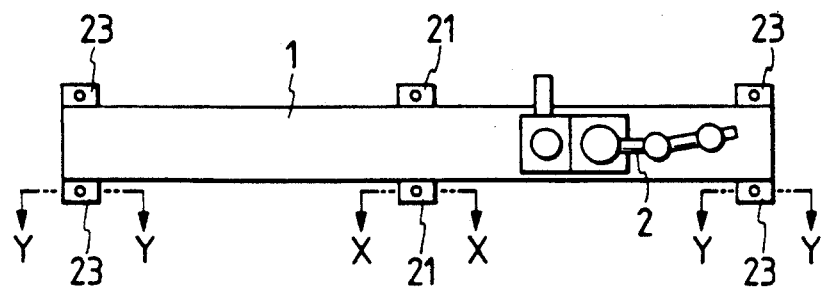
FIG. 4 is a front view showing one example of a traveling stand mounting structure for a traveling type robot device according to this invention.

FIG. 4 is a plan view showing one example of a mounting structure of a traveling type industrial robot device according to this invention.

Figure 5A:
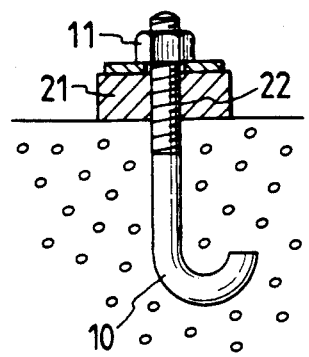
FIG. 5A is an enlarged sectional view taken along line X—X in FIG. 4.
Figure 5B:
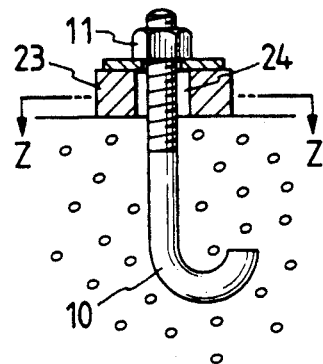
FIG. 5B is an enlarged sectional view taken along line Y—Y in FIG. 4.
Figure 5C:
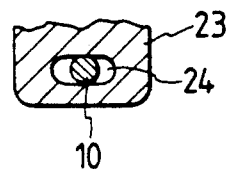
FIG. 5C is an enlarged sectional view taken along line Z—Z in FIG. 5B.

In FIG. 4, reference 21 designates a fixing member provided at the middle of a range of the traveling stand in which the robot device 2 can travel. The fixing member 21, as shown in FIG. 5A, comprises at each end: an anchor bolt 10 embedded in a floor; a bolt hole 22; and a nut 11 for tightening the anchor bolt 10. Further in FIG. 4, reference numerals 23 designate other fixing members. In each of the fixing members 23, its each bolt hole 24, into which the anchor bolt 10 is inserted, is elongated with the amount of expansion taken into account, as shown in FIGS. 5B and 5C. The fixing members are fixed by tightening the nuts 11 to the extend that, when the traveling stand 1 is expanded or contracted, the fixing member 21 and accordingly the traveling stand is allowed to move.

Figure 6:
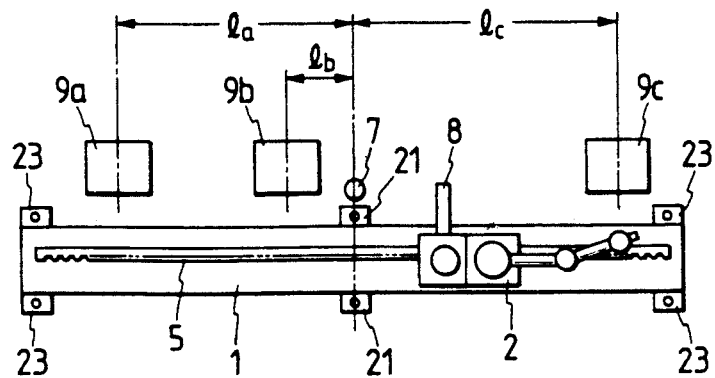
FIG. 6 is a plan view for a description of the function of the traveling stand mounting structure according to the invention.

FIG. 6 is a plan view showing the robot device 2 on the traveling stand 1, and a plurality of work stations 9a, 9b and 9c arranged along the traveling stand 1. In FIG. 6, reference numeral 7 designates an original point position detector fixedly positioned on a concrete floor on the central line of the fixing member 21.

Before the robot device thus organized is started, distances la, lb and lc for which, with the original point position detector 7 as a reference point, the robot device 2 should travel to reach the work stations 9a 9b and 9c, respectively, are stored in a memory in a control device (not shown) by using numerical data corresponding to the numbers of revolution of a pinion engaged with the rack 5. If, after the robot device has been taught in the above-described manner, the ambient temperature increases so that the distances for which the robot device 2 travels to reach the work stations 9a, 9b and 9c are changed to la1, lb1 and lc1, then errors $\Delta la = la - la1$, $\Delta lb = lb - lb1$, and $\Delta lc = lc1$ are produced, respectively. Similarly as in the above-described case, the difference between the ambient temperature provided at the time of teaching and that provided when the robot device is in operation is 30°, and the robot traveling range is 10 m, the distance between the original point and the work station 9c farthest from the original point is 5 m in maximum. Therefore, the distance error ($\Delta lc$) with respect to the robot device 2 is a little over 1.5 mm in maximum. That is, the error is reduced to half of that which occurs with the conventional robot device in which the original point is set at the end of the traveling stand 1.

If the error of a little over 1.5 mm is out of the range of errors allowed to the robot operation at the work station 9c, and the error should be corrected, then it can be positively corrected, with the original point held at the predetermined position as a reference point, by temperature correcting means provided in the control device. If necessary, the errors $\Delta lb$ and $\Delta lc$ can be corrected similarly.

In the above-described embodiment, the original point is fixedly set on the floor surface; however, it may be provided on the traveling stand 1 or the work station with the same effect if it is located on or near the central liens of the fixing member 21 positioned at the middle of the robot traveling range.

As was described above, according to the invention, the fixing member which is so designed that its position is not affected by the change in ambient temperature is positioned at the middle of the robot traveling range, and the original point is positioned on the middle mentioned above. Therefore, the error in travel distance which is caused by the difference between the temperature provided at the time of teaching the robot and that provided when the robot is in operation can be reduced according to the invention. If necessary, the temperature correction based on the original point stable in position can be positively carried out.

What is claimed is:

1. A traveling stand for a traveling type industrial robot device, along which said industrial robot device moves to carry out predetermined operation according to a predetermined operation order to a plurality of work stations arranged along said traveling stand comprising:

a plurality of means for securing said traveling stand to a desired installation place;

one of said securing means acting as a non-movable member, said non-movable member being positioned at a middle of a range of travel of said robot device on said raveling stand and said non-moving member having a structure which is adapted to not be affected adversely by expansion or contraction of said traveling stand caused by changes in ambient temperature;

the remaining securing means acting as movable members, said movable members being adapted to be allowed to move with respect to said installation place in response to the expansion or contraction of said traveling stand due to changes in the ambient temperature; and a traveling original point of said robot being set at said middle of the range of travel of said robot.

2. The stand of claim 1 wherein each of said movable members has an ellipse through hole receiving a member for fixing said stand to said installation place, and said securing members are allowed to move in a longitudinal direction of said stand in response to the expansion or contraction of said stand.

3. The stand of claim 1 wherein each of said securing members comprises a bolt and a nut.

* * * * *